US010108704B2

(12) United States Patent
Awadallah et al.

(10) Patent No.: US 10,108,704 B2
(45) Date of Patent: Oct. 23, 2018

(54) IDENTIFYING DISSATISFACTION SEGMENTS IN CONNECTION WITH IMPROVING SEARCH ENGINE PERFORMANCE

(75) Inventors: Ahmed Hassan Awadallah, Redmond, WA (US); Yi-Min Wang, Bellevue, WA (US); Ryen William White, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1013 days.

(21) Appl. No.: 13/604,627

(22) Filed: Sep. 6, 2012

(65) Prior Publication Data
US 2014/0067783 A1 Mar. 6, 2014

(51) Int. Cl.
*G06F 17/30* (2006.01)

(52) U.S. Cl.
CPC .. *G06F 17/30699* (2013.01); *G06F 17/30657* (2013.01)

(58) Field of Classification Search
CPC ............... G06F 17/30699; G06F 17/30657
See application file for complete search history.

(56) References Cited

U.S. PATENT DOCUMENTS

| | | | |
|---|---|---|---|
| 7,249,121 B1 | 7/2007 | Bharat et al. | |
| 7,590,646 B2 | 9/2009 | Galinda-Legaria et al. | |
| 7,774,339 B2 * | 8/2010 | White et al. | 707/722 |
| 8,195,654 B1 * | 6/2012 | Riley et al. | 707/726 |
| 2004/0215607 A1 * | 10/2004 | Travis, Jr. | 707/3 |
| 2005/0065774 A1 * | 3/2005 | Doganata et al. | 704/7 |
| 2005/0125390 A1 * | 6/2005 | Hurst-Hiller et al. | 707/3 |
| 2006/0206477 A1 * | 9/2006 | Dalvi | G06F 17/30542 |
| 2006/0212265 A1 * | 9/2006 | Amitay et al. | 702/182 |
| 2006/0224579 A1 * | 10/2006 | Zheng | 707/5 |

(Continued)

OTHER PUBLICATIONS

Liu, Yiqun, et al. "Automatic search engine performance evaluation with click-through data analysis." Proceedings of the 16th international conference on World Wide Web. ACM, 2007.*

(Continued)

*Primary Examiner* — Belix M Ortiz Ditren
(74) *Attorney, Agent, or Firm* — Medley, Behrens & Lewis, LLC

(57) ABSTRACT

Technologies pertaining to automatically identifying sets of query attribute values that are highly correlative with user dissatisfaction with a search engine are described. Dissatisfied queries are automatically identified through analysis of search logs, wherein a dissatisfied query is a query submitted to a search engine by a user, wherein the user was dissatisfied with search results provided by the search engine responsive to receipt of the query. Sets of query attribute values that are highly correlated with dissatisfied queries, and thus user dissatisfaction, are automatically identified based at least in part upon the identifying of the dissatisfied queries. Subsequent to identifying a set of query attribute values, a segment-specific ranker is learned that is configured to rank search results responsive to receipt of a query with the set of query attribute values, wherein the segment-specific ranker outperforms a general purpose ranker for queries having the set of query attribute values.

20 Claims, 8 Drawing Sheets

(56) References Cited

U.S. PATENT DOCUMENTS

| | | | |
|---|---|---|---|
| 2006/0248057 A1* | 11/2006 | Jacobs et al. | 707/3 |
| 2007/0106659 A1* | 5/2007 | Lu et al. | 707/5 |
| 2007/0179949 A1* | 8/2007 | Sun et al. | 707/6 |
| 2007/0255689 A1* | 11/2007 | Sun et al. | 707/3 |
| 2008/0270356 A1* | 10/2008 | Anderson et al. | 707/3 |
| 2008/0306937 A1* | 12/2008 | Whilte et al. | 707/5 |
| 2009/0112781 A1* | 4/2009 | Heath et al. | 706/21 |
| 2009/0327224 A1* | 12/2009 | White et al. | 707/3 |
| 2010/0174736 A1* | 7/2010 | Goodall et al. | 707/769 |
| 2011/0004588 A1* | 1/2011 | Leitersdorf et al. | 707/711 |
| 2012/0011112 A1 | 1/2012 | Bian et al. | |
| 2012/0078825 A1* | 3/2012 | Kulkarni et al. | 706/12 |
| 2012/0143789 A1* | 6/2012 | Wang et al. | 706/12 |
| 2012/0143790 A1* | 6/2012 | Wang et al. | 706/12 |
| 2012/0150854 A1* | 6/2012 | Song et al. | 707/728 |

OTHER PUBLICATIONS

Bar-Ilan, Judit. "Methods for measuring search engine performance over time." Journal of the American Society for Information Science and Technology 53.4 (2002): 308-319.*

Sharma, Himanshu, and Bernard J. Jansen. "Automated evaluation of search engine performance via implicit user feedback." Proceedings of the 28th annual international ACM SIGIR conference on Research and development in information retrieval. ACM, 2005.*

White, Ryen W., and Steven M. Drucker. "Investigating behavioral variability in web search." Proceedings of the 16th international conference on World Wide Web. ACM, 2007.*

Yih, et al., "Improving Similarity Measures for Short Segments of Text", Retrieved at <<http://research.microsoft.com/pubs/73713/yihmeek07.pdf>>, Proceedings of the 22nd national conference on Artificial intelligence (AAAI'07), Jul. 22, 2007, pp. 1489-1494.

Cetindil, et al., "Analysis of Instant Search Query Logs (Full Version)", Retrieved at <<http://ipubmed.ics.uci.edu/pubs/instant-search-log-analysis-full2012.pdf>>, Retrieved Date: May 10, 2012, pp. 1-10.

Manion, Josh, "Segmentation", Retrieved at <<http://www.stratigent.com/community/websight-newsletters/segmentation>>, Retrieved Date: May 10, 2012, pp. 1-5.

Bendersky, et al., "Analysis of Long Queries in a Large Scale Search Log", Retrieved at <<http://maroo.cs.umass.edu/pdf/IR-701.pdf>>, Workshop on Web Search Click Data (WSCD '09), Feb. 9, 2009, pp. 1-7.

* cited by examiner

FIG. 2

| | ATTRIBUTE 1 | ATTRIBUTE 2 | | ATTRIBUTE N | LABEL |
|---|---|---|---|---|---|
| DISSATISFIED QUERY 1 | TRUE | FALSE | ••• | TRUE | DSAT |
| DISSATISFIED QUERY 2 | TRUE | FALSE | ••• | FALSE | DSAT |
| DISSATISFIED QUERY 3 | FALSE | TRUE | ••• | TRUE | DSAT |
| ••• | | | | | |
| DISSATISFIED QUERY M | TRUE | FALSE | ••• | FALSE | SDAT |
| SATISFIED QUERY 1 | FALSE | FALSE | ••• | TRUE | SAT |
| SATISFIED QUERY 2 | TRUE | TRUE | ••• | FALSE | SAT |
| SATISFIED QUERY 3 | TRUE | FALSE | ••• | TRUE | SAT |
| ••• | | | | | |
| SATISFIED QUERY P | FALSE | TRUE | ••• | TRUE | SAT |

200

IDENTIFYING DISSATISFACTION SEGMENTS IN CONNECTION WITH IMPROVING SEARCH ENGINE PERFORMANCE

BACKGROUND

Search engines have emerged as heavily used tools that allow users thereof to quickly locate information that is pertinent to respective information retrieval goals of the users. Accordingly, a search engine is expected by users to handle a broad range of different types of information retrieval requests. Ranking algorithms (rankers) utilized in conventional search engines, however, are trained as general-purpose (one-size-fits-all) rankers with a single ranking function being applied to all queries. Inevitably, then, a search engine can provide search results responsive to receipt of a query that are not particularly relevant to the information retrieval goal of a user who issued the query to the search engine.

With more specificity, a ranker typically considers various features of a query and documents when ranking documents responsive to receipt of the query. When ranking the documents, the ranker assigns learned respective weights to the aforementioned features, wherein the weights are learned during a training procedure to optimize performance of the ranker with respect to some known information retrieval metric, such as normalized discounted cumulative gain (NDCG). The weights are learned through utilization of labeled training data, wherein the labeled training data includes labeled query/document relevance judgments. Weights of features considered by the ranker when ranking search results are then learned such that the overall performance of the ranker, with respect to labeled validation data, is optimized for the information retrieval metric.

As discussed above, since the ranker is learned to optimize information retrieval for all types of queries in the training data, there may exist certain types of queries with respect to which the ranker, and thus the search engine, performs relatively poorly. Revenue generated by a search engine is tied to user traffic; accordingly, it is desirable to attract new users to the search engine as well as to retain existing users. Therefore, it can be ascertained that improving performance of search engines with respect to various different types of queries is desirable.

SUMMARY

The following is a brief summary of subject matter that is described in greater detail herein. This summary is not intended to be limiting as to the scope of the claims.

Described herein are various technologies pertaining to identifying sets of query attributes values that are highly correlated with user dissatisfaction with respect to performance of a search engine. Query attributes can refer to attributes pertaining solely to queries, such as lengths of queries, locations from which queries are issued, etc. Query attributes can also include attributes pertaining to a search engine results page (SERP) that is provided by a search engine responsive to receive of a query, including identities of search results, whether the SERP includes a proposed spelling correction, whether an answer was provided by the search engine on the SERP, and the like. Responsive to a set of query attribute values being identified as being highly correlated to user dissatisfaction with performance of a search engine, at least one computing task can be undertaken. For example, such a computing task may be the generation of an alert to a developer of a ranker that indicates that the ranker performs relatively poorly when receiving queries with the set of query attribute values. In another example, the computing task can include learning a segment-specific ranker that is selectively employed when a query with the set of query attribute values is received by the search engine, wherein the segment-specific ranker performs better than the general-purpose ranker of the search engine with respect to queries having the set of query attribute values.

In connection with identifying the set of query attribute values, dissatisfied queries can be identified, wherein a dissatisfied query is one in which the user who submitted the query was dissatisfied with search results retrieved by a search engine responsive to receiving such query. In an exemplary embodiment, dissatisfied queries can be identified via explicit user feedback indicating dissatisfaction with search results. In another exemplary embodiment, dissatisfied queries can be automatically identified from contents of a search engine log. For instance, the search engine log can indicate that a user submitted a query to the search engine and shortly thereafter switched to a different search engine and submitted the same query. If the switching of search engines and the provision of the same query to both search engines occurs within some threshold amount of time, the query can be labeled as a dissatisfied query. In another exemplary embodiment, dissatisfied queries can be identified using search engine logs in instances when a search engine switch did not occur; for instance, a user may abstain from clicking on any search results provided by the search engine responsive to receipt of a query, indicating user dissatisfaction.

Similarly, satisfied queries can be identified, wherein a satisfied query is a query submitted to the search engine by a user who was satisfied with the search results provided by the search engine responsive to receipt of the query. Such satisfied queries can be identified based upon explicit user feedback. In another exemplary embodiment, satisfied queries can be automatically identified through analysis of the search engine log, wherein a user selection of a search result provided by the search engine and subsequent dwelling on the selected search result for at least a threshold amount of time is indicative of the user being provided with desired information, and thus being satisfied with the search results.

Subsequent to dissatisfied queries and satisfied queries being identified, query attribute values for respective attributes of the queries can be extracted. Exemplary attributes can include a classification assigned to a query by an automatic classifier, a number of terms in a query, location from which the query was submitted, etc. Subsequent to the query attribute values being received/extracted, subsets of query attribute values that are highly correlated with user dissatisfaction with the search engine can be automatically identified. For example, for a subset of query attribute values observed in dissatisfied queries, a correlation value can be generated that is indicative of a correlation between the subset of query attribute values and user dissatisfaction with the search engine, wherein such correlation value is based at least in part upon the query attribute values of the dissatisfied queries, the query attribute values of the satisfied queries, and the identifying of queries as being dissatisfied queries or satisfied queries.

If the correlation value is above a threshold (e.g. 1), then the subset of query attribute values can be identified as a dissatisfaction segment. Additionally, multiple thresholds can be defined to determine a particular "level" of user dissatisfaction. Subsequently, at least one computing task can be undertaken based at least in part upon the subset of query attribute values being identified as a dissatisfaction segment. Exemplary computing tasks can include the automatic generation of a notification to a developer of a ranker for the search engine, wherein the developer can add or remove features considered by the ranker to improve performance of the search engine with respect to queries belonging to the dissatisfaction segment (e.g., queries having the subset of query attribute values) without decreasing overall performance of the ranker. In another exemplary embodiment, the at least one computing task can comprise learning feature weights to be employed by a segment-specific ranker. For example, feature weights of the segment-specific ranker can be learned to improve performance of the search engine with respect to queries belonging to the dissatisfaction segment. Subsequently, when a user of the search engine issues a query belonging to the dissatisfaction segment, the segment-specific ranker can be selected (rather than a general-purpose ranker of the search engine), and the segment-specific ranker can rank search results responsive to receipt of the query. Thus, for instance, a search engine can include multiple segment-specific rankers that are selectively employed based upon query attribute values of queries submitted to the search engine, thereby increasing overall performance of the search engine.

Other aspects will be appreciated upon reading and understanding the attached figures and description.

BRIEF DESCRIPTION OF THE DRAWINGS

FIG. 2 illustrates exemplary query attribute values.

DETAILED DESCRIPTION

Figure 1:
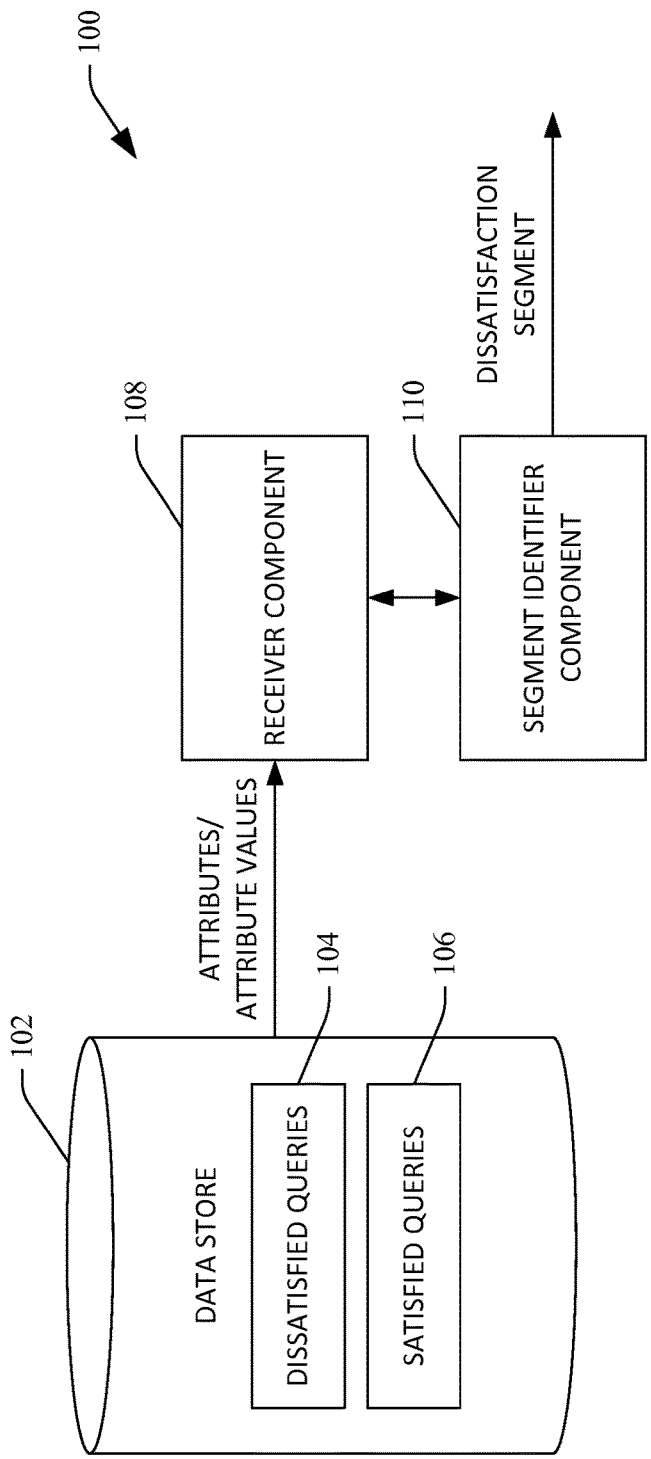
FIG. 1 is a functional block diagram of an exemplary system that facilitates identifying query attribute values that are relatively highly correlated with user dissatisfaction with a search engine.

Various technologies pertaining to identifying query attribute values that are relatively highly correlated with user dissatisfaction with a search engine will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates identifying sets of query attribute values that are relatively highly correlated with user dissatisfaction with a search engine when a query with such a set of query attribute values is provided to the search engine is illustrated. The system 100 comprises a data store 102 that comprises a plurality of dissatisfied queries 104 and a plurality of satisfied queries 106. The data store 102 can be or include any suitable computer-readable data storage device, such as memory, a hard drive, flash memory, etc. A dissatisfied query, as the term is used herein, is a query that has been submitted to a search engine by a user who was dissatisfied with search results presented to the user by the search engine responsive to the user submitting the query to the search engine. A satisfied query is a query that is submitted to the search engine by a user who was satisfied with search results presented to the user by the search engine responsive to the user submitting the query to the search engine.

A label can be assigned to a dissatisfied query to indicate that the query is a dissatisfied query. Likewise, a label can be assigned to a satisfied query to indicate that the query is a satisfied query. In an exemplary embodiment, such labels can be based upon explicit user feedback with respect to their satisfaction (or lack thereof) with search results presented by the search engine responsive to the user submitting respective queries to the search engine. For instance, a search engine can be configured with a tool (e.g., a selectable feedback button) that receives explicit feedback of users with respect to their subjective views as to quality of search results presented thereto. Such explicit feedback can be employed to assign a label to a query as being, for instance, a satisfied query or a dissatisfied query. In another exemplary embodiment, and as will be described in greater detail below, a search engine log can be analyzed and a query can be automatically labeled as being a dissatisfied query or a satisfied query based on the analysis of the search engine log. It is to be understood that the term "search engine log" is intended to encompass user interaction with respect to a search engine captured by a toolbar installed on a web browser.

Each dissatisfied query and each satisfied query can have a respective plurality of query attribute values for respective attributes of the queries. Exemplary attributes can include categories assigned to a respective query by a classifier, such as, for instance, entertainment (a query pertaining to entertainment, such as a search for a web site of a celebrity, celebrity news, etc.), names (a query for a particular name of an individual or entity), commerce, navigational, transactional, sports, or any other suitable category. Other exemplary attributes can include length of the respective query (number of terms of the query and/or characters in the query), language of the respective query, and the like. Still other exemplary attributes can include whether the search engine displayed a direct answer for the respective query, a type of answer displayed, whether a query suggestion was displayed, location from which the query was issued, vertical of a search engine used to issue the query (e.g., general, web, news, images, shopping), temporal attributes, such as day of week, time of day (morning, evening), month, season, etc. As mentioned above, each query in the dissatisfied queries 104 and each query in the satisfied queries 106 can have query attribute values for such query attributes.

The system 100 further comprises a receiver component 108 that receives a first set of query attribute values for the dissatisfied queries 104 and a second set of query attribute values for the satisfied queries 106. With reference briefly to FIG. 2, an exemplary depiction of a data set 200 that can be received by the receiver component 108 is illustrated. The data set 200 includes attribute values for M dissatisfied queries and attribute values for P satisfied queries. For each dissatisfied query in the M dissatisfied queries, the data set 200 includes a respective query attribute value for each of N respective query attributes, as well as a respective label that indicates that a respective query is a dissatisfied query. Similarly, for each satisfied query in the P satisfied queries, the data set 200 comprises a respective query attribute value for each of the N query attributes as well as a respective label that indicates that a query is a satisfied query. While the attribute values in FIG. 2 are shown as being binary in nature (e.g., "true" or "false"), it is to be understood that the attribute values may be any suitable values.

Returning to FIG. 1, the system 100 further comprises a segment identifier component 110 that is in communication with the receiver component 108. The segment identifier component 110 selects a subset of query attribute values observed for at least one query in the dissatisfied queries 104 and computes a correlation value for such subset of query attribute values. The correlation value for the subset of query attribute values is indicative of a correlation between the subset of query attribute values and user dissatisfaction with the search engine. This correlation value can be computed based at least in part upon the subset of query attribute values themselves, as well as the labels that indicate that queries are one of the dissatisfied queries 104 or the satisfied queries 106. In an exemplary embodiment, the segment identifier component 110 can compute the correlation value by way of the following algorithm:

$$\text{correlation value} = \frac{P(A, DSAT)}{P(A)P(DSAT)} \quad (1)$$

wherein P(A, DSAT) is a probability of the subset of query attribute values A occurring in a dissatisfied query DSAT, P(A) is a probability of the subset of query attribute values A occurring in any query, and P(DSAT) is a probability of a query being a dissatisfied query. Pursuant to an example, P(A, DSAT) can be estimated by dividing a total number of queries in the dissatisfied queries 104 that have the subset of query attribute values by the number of queries in the dissatisfied queries 104 plus the number of queries in the satisfied queries 106. P(A) can be estimated by dividing a number of queries in the dissatisfied queries 104 that have the subset of query attribute values plus the number of queries in the satisfied queries 106 that have the subset of query attribute values by the number of dissatisfied queries 104 plus the number of satisfied queries 106. P(DSAT) is the number of dissatisfied queries 104 divided by the number of dissatisfied queries 104 plus the number of satisfied queries 106.

As can be readily ascertained, the segment identifier component 110 can compute correlation values for multiple respective subsets of query attribute values observed in the dissatisfied queries 104. In an exemplary embodiment, the segment identifier component 110 can exhaustively analyze each potential subset of query attribute values observed in the dissatisfied queries 104, such that the segment identifier component 110 computes correlation values for each possible subset of query attribute values in the dissatisfied queries 104. In another exemplary embodiment, a computer executable algorithm can be configured to selectively generate candidate subsets of query attribute values based upon, for instance, frequency of occurrence of the subset of query attribute values in the dissatisfied queries 104. For example, the frequency pattern growth (FP-growth) algorithm can be employed by the segment identifier component 110 to identify subsets of query attribute values that co-occur relatively frequently in the dissatisfied queries 104.

Subsequent to the segment identifier component 110 generating a correlation value for a subset of query attribute values observed in the dissatisfied queries 104, the segment identifier component 110 can compare such correlation value with a threshold value and can cause a computing operation to be undertaken based at least in part upon the comparison. For example, if the segment identifier component 110 determines that the correlation value is above the threshold, then the subset of query attribute values is relatively highly correlated with user dissatisfaction with the search engine. This subset of attribute values can then be labeled as a dissatisfaction segment. The segment identifier component 110, in an example, may cause a notification to be automatically generated and transmitted to a developer of a ranker employed by the search engine to rank search results, wherein the notification indicates to the developer that the dissatisfaction segment exists and that improvements with respect to such dissatisfaction segment are desirable. The developer of the ranker can review the dissatisfaction segment and can update, for instance, the general-purpose ranker of the search engine to consider additional features or fewer features that improve performance of the search engine with respect to queries having query attribute values (belonging to the dissatisfaction segment) in the dissatisfaction segment and not affecting performance detrimentally for the set of queries that do not belong to the segment. This can result in an increase in the overall effectiveness of the general-purpose search engine.

In another exemplary embodiment, a segment-specific ranker can be learned based at least in part upon the segment identifier component 110 identifying the subset of query attribute values as being a dissatisfaction segment. As will be described in greater detail below, feature weights considered by the segment-specific ranker can be learned to improve search results provided to users who submit queries belonging to the dissatisfaction segment. Accordingly, if a user submits a query belonging to the dissatisfaction segment, the segment-specific ranker, rather than a general purpose ranker, can be employed to retrieve and rank search results.

In still yet another exemplary embodiment, the segment identifier component 110 can be configured to compute correlation metrics for the subset of attribute values at different points in time, thereby allowing for user dissatisfaction with respect to the dissatisfaction segment to be monitored over time for improvement. In an example, the segment identifier component 110 can compute a first correlation value for the subset of query attribute values at a first point in time, wherein the first correlation value indicates that the subset of query attribute values is a dissatisfaction segment. Subsequently, in an example, the ranker can be modified to consider additional features. After the ranker has been deployed and a sufficient amount of data in a search log is available for analysis, the segment identifier component 110 can compute a second correlation value for the subset of query attribute values (based upon performance of the modified ranker), and the first correlation value and the second correlation value can be reviewed to compare performance of the pre-modification ranker with the post-modification ranker with respect to the dissatisfaction segment. Thus, correlation values can be employed to track performance of the ranker over time.

Figure 3:
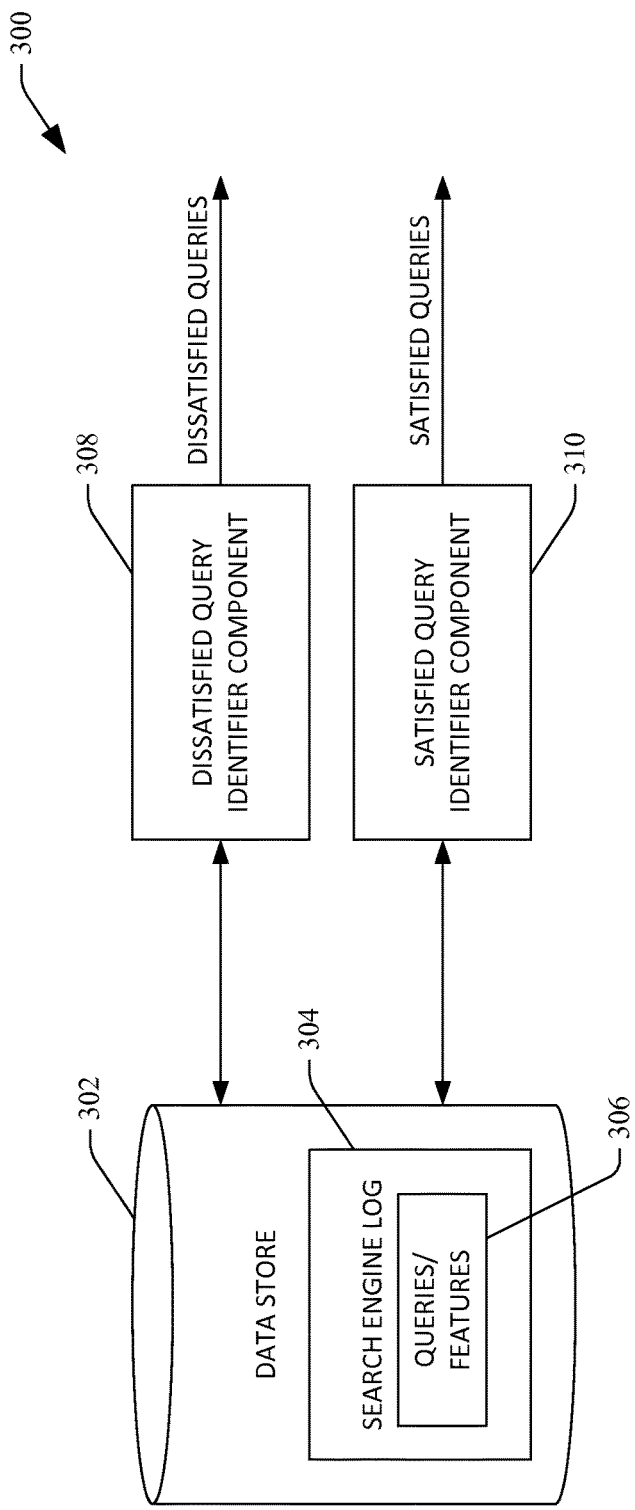
FIG. 3 is a functional block diagram of an exemplary system that facilitates automatically identifying dissatisfied queries and satisfied queries from a search engine log.

With reference now to FIG. 3, an exemplary system 300 that facilitates automatically identifying dissatisfied queries and satisfied queries is illustrated. The system 300 comprises a data store 302 that includes a search engine log 304. The search engine log 304 includes queries/features 306, wherein the queries/features 306 comprise queries submitted by users of the search engine and features corresponding thereto. Such features can include data that identifies search engine switching, wherein search engine switching is the process describing a user's voluntary transition from a first web search engine to a second web search engine. A search engine switching event can be defined as a pair of consecutive queries (a pre-switch query and a post-switch query) that are issued on different search engines within a single search session. A search session can be defined as user interaction with a search engine that does not include more than a threshold amount of idle time or time away from the search engine.

In an example, users of a web browser may have a toolbar installed thereon, and may consent to allow browsing activity of the user to be monitored (without retaining or inferring user identity). When such an approach is employed, search engine switching events can be monitored. It can be noted that in identifying a pre-switch query, if a user issued a query to retrieve and select link to a target search engine, such query can be regarded as part of the search engine switching event and the preceding query in the pre-switch engine can be considered the pre-switch query.

The system 300 can comprise a dissatisfied query identifier component 308 that accesses the search engine log 304 in the data store 302 and automatically identifies dissatisfied queries based at least in part upon the queries/features 306 in the search engine log 304, including data that indicates that the user who submitted a query performed a search engine switch with respect to such query. Pursuant to an example, the dissatisfied query identifier component 308 can be a classifier trained on a set of training data, where users explicitly identified that a search engine switch was performed due to the user dissatisfaction with search results provided by the first search engine. In an exemplary embodiment, the dissatisfied query identifier component 308 can be a logistic regression classifier.

Exemplary features that can be considered by the dissatisfied query identifier component 308 include query features. Exemplary query features comprise a number of characters in a query, a number of words in a query, and an amount of time between pre-switch and post switch queries. Other features that can be considered by the dissatisfied query identifier component 308 include pre/post switch features. Such features can include, but are not limited to, a number of queries in a search session, a number of unique queries in the search session, a number of query reformulations in the search session, a number of search result selections in the search session, a number of search result selections with dwell time greater than some threshold (e.g., 30 seconds), a number of search result selections with dwell time less than some threshold (e.g., 15 seconds), a number of clicks on URLs containing a query term in their respective titles, a length of a trail from a search engine result page (SERP) (which can be defined as a number of clicks from a search engine result page), a number of transitions between every action pair $\alpha_i \rightarrow \alpha_j$ for every $\alpha_i \in A$, where A={Query, SERPClick, Ad–Click, Answer, etc.}, and average dwell time for every action pair $\alpha_i \rightarrow \alpha_j$.

The system 300 can further comprise a satisfied query identifier component 310 that automatically identifies the satisfied queries 106 through analysis of the search engine log 304. Pursuant to an example, the satisfied query identifier component 310 can locate queries in the search engine log 304 where, for each query, a search result was selected and dwelled upon for some amount of time greater than a threshold (e.g., 30 seconds), and wherein the search result was the only search result selected or was the last search result selected for the query. The query attribute values for each dissatisfied query and for each satisfied query utilized by the segment identifier component 110 can also be extracted automatically from the search engine log 304 subsequent to the dissatisfied queries 104 and the satisfied queries 106 being identified by the dissatisfied query identifier component 308 and the satisfied query identifier component 310, respectively.

Figure 4:
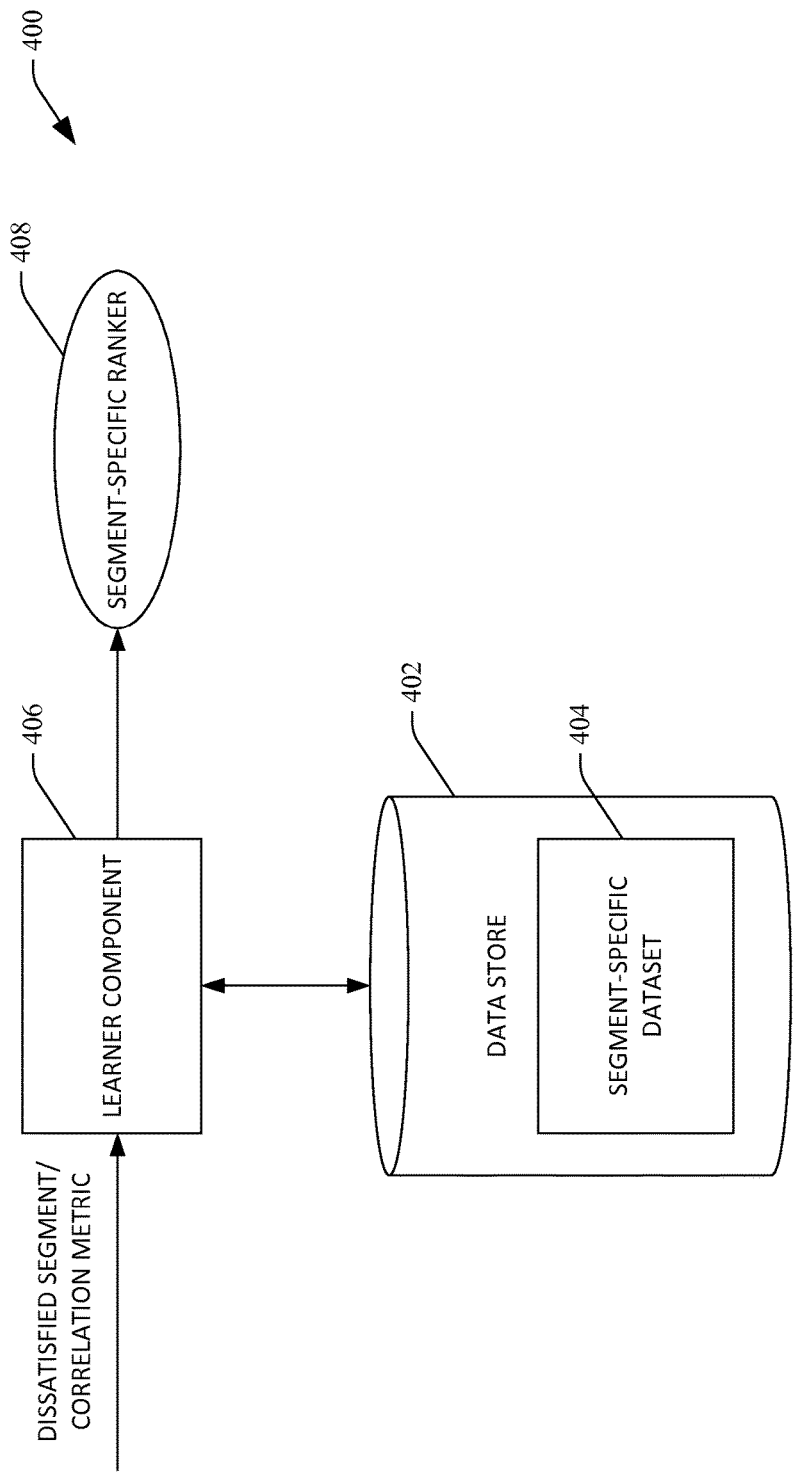
FIG. 4 is a functional block diagram of an exemplary system that facilitates learning a segment-specific ranker.

Now referring to FIG. 4, an exemplary system 400 that facilitates learning a segment-specific ranker for a dissatisfaction segment is illustrated. The system 400 comprises a data store 402 that includes a labeled segment-specific data set 404. Pursuant to an example, the segment-specific data set 404 may comprise queries belonging to the dissatisfaction segment, as well as labeled query/document relevance judgments. Such labeled query/document relevance judgments can be made explicitly by trained human judges or mined implicitly from search logs. If implicitly mined, such implicit mining can be based on, for instance, click-through behavior and dwell times on landing pages. Such an approach can provide a relatively large number of labeled query/document relevance judgments. The segment-specific data set 404 can include numerous features pertaining to the queries included therein as well as numerous features corresponding to documents represented in the segment-specific dataset 404. In an exemplary embodiment, the set of features used can be the same as used for a general-purpose ranker for the search engine. Such features may include content-based features, click-based features, static rank-based features, amongst others.

The system 400 may further comprise a learner component 406 that can learn a segment-specific ranker 408 based upon the segment-specific data set 404. Since, for example, the same set of features can be used for learning the segment-specific ranker 408 as used for learning a general-purpose ranker for a search engine, additional investment is not needed, and the learner component 406 can learn the segment-specific ranker 408 based upon the same features employed for the general-purpose ranker (but trained with the segment-specific data set 404).

The system 400 illustrates automatic learning of a segment-specific ranker 408. It is to be understood that the correlation value computed by the segment identifier component 110 for the dissatisfaction segment can be employed for other purposes. For example, the correlation value can be employed as a metric that indicates performance of a search engine with respect to the dissatisfaction segment. In other embodiments, a developer of a general-purpose search engine ranker can receive a correlation value for a particular dissatisfaction segment and update the general-purpose ranker in a manner that improves performance of the ranker with respect to the dissatisfaction segment but is not detrimental to overall performance of the general-purpose search engine. For example, the developer can add or remove features to be considered when learning feature weights of the general-purpose ranker.

Moreover, it is to be understood that the systems 100, 300, and 400 described above can operate in conjunction, in a cyclical fashion, to improve search engine performance via identifying dissatisfaction segments, monitoring such segments over time, updating segment-specific rankers, and selectively employing such rankers when queries with attributes of dissatisfaction segments are received. Such cycle can be repeated, for instance, without human intervention to automatically improve search engine performance. Further, new dissatisfaction segments can be automatically identified, and new segment-specific rankers can be automatically generated.

Figure 5:
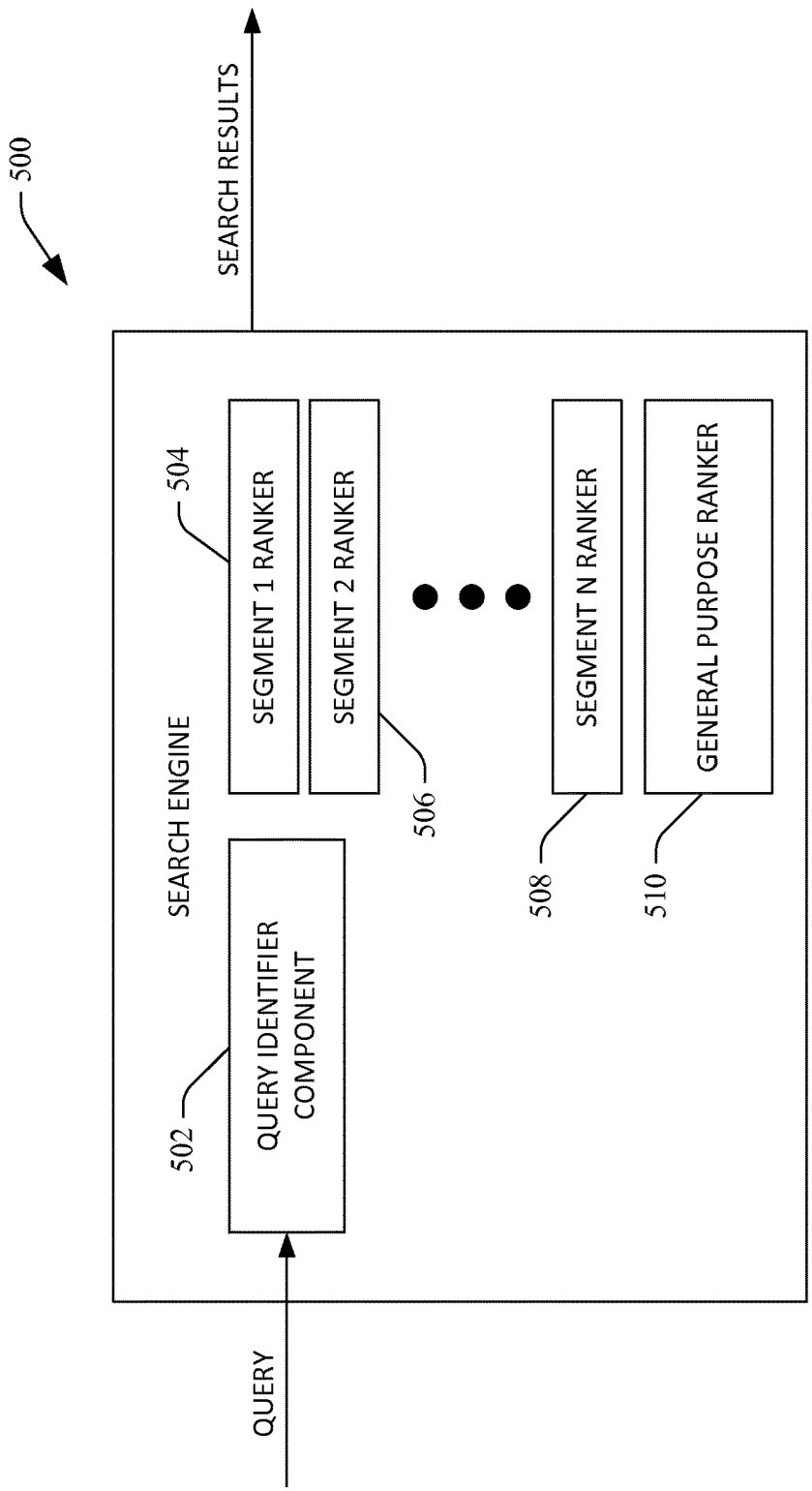
FIG. 5 is a functional block diagram of an exemplary search engine that comprises a general-purpose ranker and a plurality of segment-specific rankers.

With reference now to FIG. 5, an exemplary search engine 500 is illustrated. The search engine 500 comprises a query identifier component 502 that receives a query and 1) determines whether the query belongs to a dissatisfaction segment; and 2) if the query belongs to a dissatisfaction segment, causes a segment-specific ranker learned for the dissatisfaction segment to be employed to rank search results with respect to the query. The search engine 500 further comprises a plurality of segment-specific rankers 504-508. The search engine 500 additionally comprises a general-purpose ranker 510. If the query identifier component 502 determines that the received query does not belong to a dissatisfaction segment, then the query identifier component 502 can cause the general-purpose ranker 510 to retrieve and rank search results responsive to receipt of the query. It is therefore apparent that a segment-specific ranker can be employed, rather than the general-purpose ranker 510, when a query belongs to a dissatisfaction segment for which a segment-specific ranker has been learned. In an example, the segment-specific rankers 504-508 can be non-overlapping in nature, such that a received query can be directed to one and only one segment-specific ranker. In another exemplary embodiment, a subset of the segment-specific rankers 504-508 can be arranged in a hierarchical structure, which can be useful when individual segments are associated with a small number of queries, and are therefore less useful for ranking.

Figure 6:
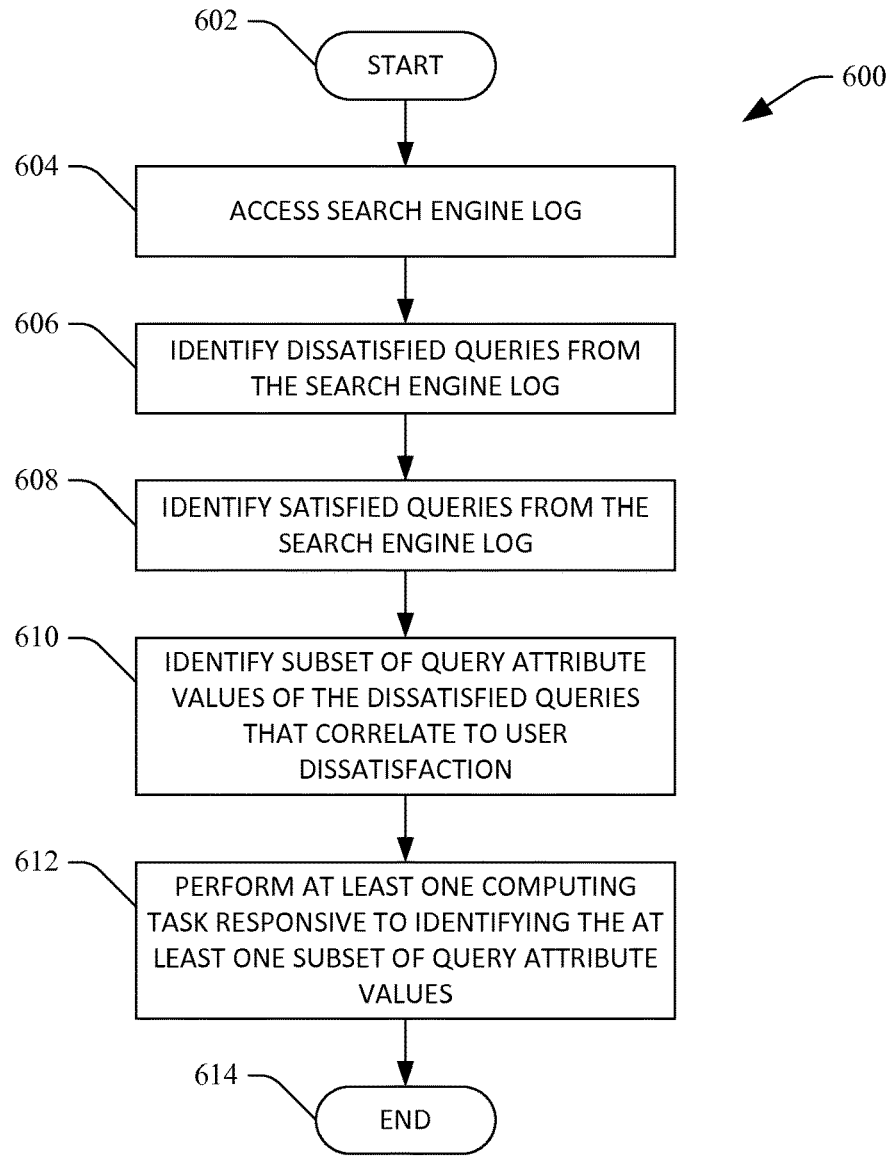
FIG. 6 is a flow diagram that illustrates an exemplary methodology for identifying a set of query attribute values that are relatively highly correlated with user dissatisfaction with a search engine.
Figure 7:
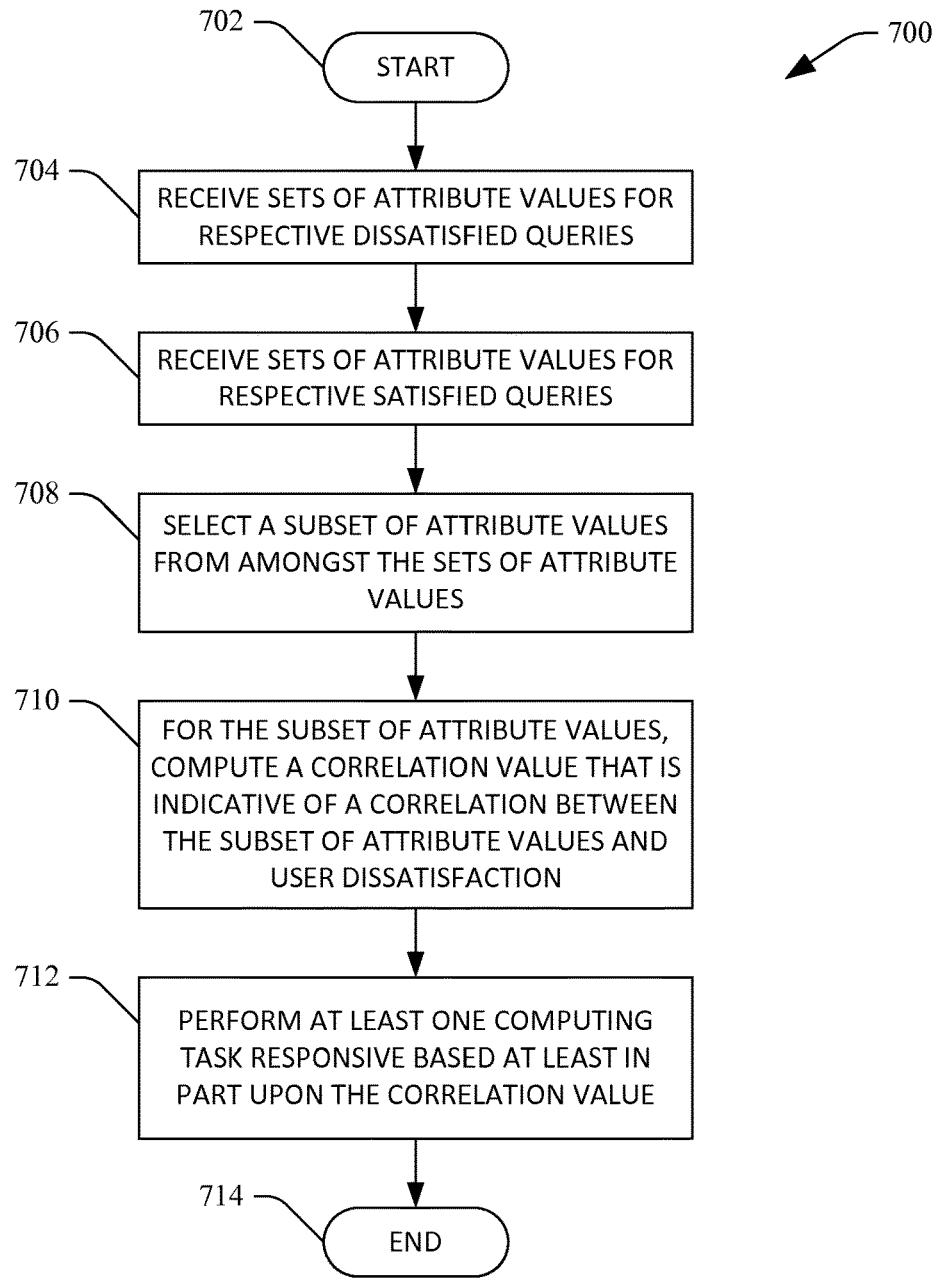
FIG. 7 is a flow diagram that illustrates an exemplary methodology for computing a correlation value that is indicative of a correlation between a set of query attribute values and user dissatisfaction with a search engine.

With reference now to FIGS. 6-7, exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagating signal.

Now referring to FIG. 6, an exemplary methodology 600 that facilitates identifying a dissatisfaction segment is illustrated. The methodology 600 starts at 602, and at 604 a search engine log is accessed. At 606, dissatisfied queries are identified from the search engine log. As described above, dissatisfied queries can be identified automatically based at least in part upon indications of a search engine switch with respect to a query in the query log. This is evidence of user dissatisfaction with a pre-switch search engine with respect to such query.

At 608, satisfied queries are automatically identified from the search engine log. As indicated above, a user search session, wherein a last or only result selected by the user is dwelled upon for over some threshold amount of time (30 seconds) can be indicative of a satisfied query.

And 610, at least one set of query attribute values observed in at least one dissatisfied query that is highly correlative with user dissatisfaction with the pre-switch search engine is identified.

At 612, at least one computing task is undertaken responsive to the identifying that the subset of query attribute values is highly correlative with user dissatisfaction with the pre-switch search engine. As mentioned above, such at least one computing task can include presentment of a correlation value to a developer of a ranker, the automatic learning of a segment-specific ranker, etc. The methodology 600 completes at 614.

Now, referring to FIG. 7, an exemplary methodology 700 that facilitates computing a correlation value that is indicative of a correlation between query attribute values and user dissatisfaction with the search engine is illustrated. The methodology starts at 702, and at 704 sets of query attribute values are received for respective dissatisfied queries. At 706, sets of attribute values for respective satisfied queries are received.

At 708, a subset of query attribute values observed in the dissatisfied queries is selected from amongst the sets of attribute values for the respective dissatisfied queries.

At 710, for the subset of query attribute values selected at 708, a correlation value is computed that is indicative of a correlation between the subset of query attribute values selected at 708 and user dissatisfaction (as evidenced by, for example, user search engine switching). At 712, at least one computing task is performed based at least in part upon the correlation value computed at 710. The methodology completes at 714.

Figure 8:
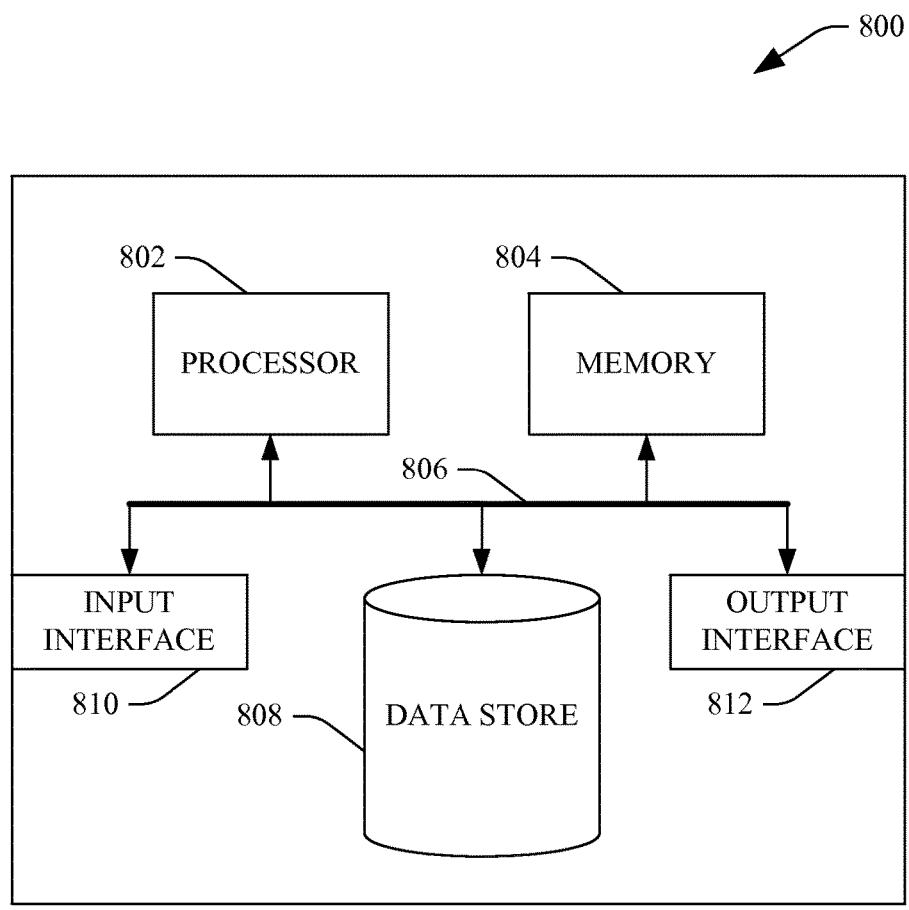
FIG. 8 is an exemplary computing device.

Now referring to FIG. 8, a high-level illustration of an exemplary computing device 800 that can be used in accordance with the systems and methodologies disclosed herein is illustrated. For instance, the computing device 800 may be used in a system that supports automatically identifying dissatisfaction segments. In another example, at least a portion of the computing device 800 may be used in a system that supports automatically identifying dissatisfied queries from a query log. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store correlation values, query/document features, etc.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, correlation values, dissatisfaction segments, query attribute values, etc. The computing device 800 also includes an input interface 810 that allows external devices to communicate with the computing device 800. For instance, the input interface 810 may be used to receive instructions from an external computer device, a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that is executed by a computer processor on a computing device, the method comprising:
receiving queries labeled as being dissatisfied queries from a computer-readable data storage device, wherein a dissatisfied query is a query submitted to a search engine by a user who was dissatisfied with search results retrieved by the search engine when provided with the query;
receiving queries labeled as being satisfied queries, wherein a satisfied query is a query submitted to the search engine by a user who was satisfied with search results retrieved by the search engine when provided with the query;
receiving query attribute values for each dissatisfied query and for each satisfied query;
for a subset of query attribute values observed for at least one dissatisfied query, computing a value that is indicative of a correlation between the subset of query attribute values and dissatisfaction of users of the search engine, wherein the value is computed based at least in part upon the queries labeled as being dissatisfied queries, the queries labeled as being satisfied queries, and the query attribute values; and
learning a segment-specific ranker based at least in part upon the value that is indicative of the correlation between the subset of query attribute values and dissatisfaction of the users of the search engine, wherein the segment-specific ranker is selected from amongst a plurality of possible rankers for ranking documents responsive to receipt of a query having the subset of query attribute values.

2. The method of claim 1, wherein the value that is indicative of a correlation between the subset of query attribute values and dissatisfaction of users of the search engine is computed as a function of a probability of the subset of query attribute values occurring in a dissatisfied query divided by a product of:
a probability of the subset of query attribute values occurring in any query; and
a probability of a query being a dissatisfied query.

3. The method of claim 1, further comprising:
automatically identifying the dissatisfied queries from logs of the search engine.

4. The method of claim 3, wherein automatically identifying the dissatisfied queries from the logs of the search engine comprises:
identifying search sessions that include a switch from the search engine to a different search engine;
identifying that a query submitted to the search engine was also submitted to the different search engine subsequent to the query being submitted to the search engine and during the search session; and
labeling the query as a dissatisfied query based at least in part upon the identifying that the query submitted to the search engine was also submitted to the different search engine subsequent to the query being submitted to the search engine and during the search session.

5. The method of claim 1, further comprising:
automatically identifying the satisfied queries from logs of the search engine.

6. The method of claim 5, wherein automatically identifying the satisfied queries from logs of the search engine comprises:
identifying a search session in a search log for the search engine;
identifying that a user viewed a search result for a threshold amount of time subsequent to issuing a query to the search engine during the search session; and
labeling the query as a satisfied query based at least in part upon the identifying that the user viewed the search result for the threshold amount of time subsequent to issuing the query to the search engine during the search session.

7. The method of claim 1, wherein learning the segment-specific ranker comprises:
updating feature weights of the segment-specific ranker.

8. The method of claim 1, further comprising:
receiving the query;
identifying that the query has the subset of attribute values; and
utilizing the segment-specific ranker, rather than a general purpose ranker of the search engine, to rank search results retrieved responsive to receipt of the query.

9. A system, comprising:
a processor; and
memory that comprises instructions that, when executed by the processor, cause the processor to perform acts comprising:
receiving first sets of query attribute values for attributes of queries labeled as being dissatisfied queries, a dissatisfied query being a query submitted by a dissatisfied user who was dissatisfied with search results presented to the dissatisfied user by a search engine responsive to the dissatisfied user submitting the query to the search engine;
receiving second sets of query attribute values for the attributes of queries labeled as satisfied queries, a satisfied query being a query submitted by a satisfied user who was satisfied with search results presented to the satisfied user by the search engine responsive to the satisfied user submitting the query to the search engine;

computing a correlation value for a subset of query attribute values from amongst the first sets of query attribute values based at least in part upon the first sets of query attribute values and the second sets of query attribute values;

assigning a label to the subset of query attribute values that indicates that the subset of query attribute values are correlated with user dissatisfaction with the search engine; and learning a segment-specific ranker based upon the label assigned to the subset of query attribute values, wherein the segment-specific ranker is selected from amongst a plurality of rankers when a query that includes the subset of query attribute values is received.

10. The system of claim 9, the acts further comprising: computing correlation values for a plurality of subsets of attribute values from amongst the first sets of values; and assigning labels to the subsets of attribute values that indicate that the subsets of attribute values are correlated with user dissatisfaction with the search engine.

11. The system of claim 9, wherein computing the correlation value comprises computing the correlation value as a function of a probability of the subset of query attribute values occurring in a dissatisfied query divided by a product of:

a probability of the subset of query attribute values occurring in any query; and a probability of a query being a dissatisfied query.

12. The system of claim 9, the acts further comprising identifying the dissatisfied queries from a log of the search engine.

13. The system of claim 12, wherein identifying the dissatisfied queries comprises identifying the dissatisfied queries based at least in part upon an indication in the search log that dissatisfied users that submitted the dissatisfied queries to the search engine switched to another search engine and submitted same queries to the another search engine.

14. The system of claim 9, the acts further comprising identifying the satisfied queries from a log of the search engine.

15. The system of claim 9, the acts further comprising: identifying that the query has the subset of attribute values; and responsive to identifying that the query has the subset of attribute values, causing the segment-specific ranker to rank search results for the query rather than a general-purpose ranker of the search engine.

16. A computer-readable medium comprising instructions that, when executed by a processor, cause the processor to perform acts comprising:

accessing a search log of a search engine, the search log comprising:

a plurality of queries submitted by users of the search engine; and for each query in the plurality of queries, a set of attribute values, wherein the set of attribute values comprises an indication that a user that submitted a query in the plurality of queries switched from the search engine to a different search engine and submitted the query to the different search engine;

labeling each query in the plurality of queries as being a dissatisfied query based upon the indication that the user that submitted the query switched from the search engine to the different search engine and submitted the respective query to the different search engine;

selecting a subset of query attribute values from the set of attribute values;

computing a metric that is indicative of a correlation between user dissatisfaction with the search engine and the subset of query attribute values based at least in part upon the subset of query attribute values and the labeling of each query in the plurality of queries as being the dissatisfied query; and learning a segment-specific ranker of the search engine based upon the metric, wherein responsive to receipt of a query that has the subset of query attribute values, the segment-specific ranker is selected for ranking search results based upon the query, and further wherein the segment-specific ranker is selected from amongst a plurality of possible rankers when the query is received.

17. The computer-readable medium of claim 16, wherein the metric is computed as a function of a probability of the subset of query attribute values occurring in a dissatisfied query divided by a product of:

a probability of the subset of query attribute values occurring in any query; and a probability of any query being a dissatisfied query.

18. The computer-readable medium of claim 16, the acts further comprising:

receiving the query from a client computing device; and responsive to receiving the query, selecting the segment-specific ranker for ranking search results based upon the query.

19. The computer-readable medium of claim 18, the acts further comprising:

receiving a second query from a second client computing device, wherein the second query has a second subset of query attribute values that are different from the query attribute values; and selecting a general purpose ranker for ranking search results based upon the second query, wherein the general purpose ranker is selected rather than the segment-specific ranker.

20. The computer-readable medium of claim 18, wherein the plurality of possible rankers include a general purpose ranker.

* * * * *